(12) United States Patent
Michino

(10) Patent No.: US 9,883,015 B2
(45) Date of Patent: Jan. 30, 2018

(54) MOBILE TERMINAL DEVICE

(71) Applicant: NEC CASIO Mobile Communications, Ltd., Kawasaki-shi, Kanagawa (JP)

(72) Inventor: Ryota Michino, Tokyo (JP)

(73) Assignee: NEC MOBILE COMMUNICATIONS, LTD., Kanagawa (JP)

( * ) Notice: Subject to any disclaimer, the term of this patent is extended or adjusted under 35 U.S.C. 154(b) by 0 days.

(21) Appl. No.: 14/435,229

(22) PCT Filed: Jun. 13, 2013

(86) PCT No.: PCT/JP2013/003727
§ 371 (c)(1),
(2) Date: Apr. 13, 2015

(87) PCT Pub. No.: WO2014/061177
PCT Pub. Date: Apr. 24, 2014

(65) Prior Publication Data
US 2015/0281414 A1    Oct. 1, 2015

(30) Foreign Application Priority Data

Oct. 18, 2012 (JP) ................................. 2012-230555

(51) Int. Cl.
*H04M 1/00* (2006.01)
*H04M 1/02* (2006.01)
(Continued)

(52) U.S. Cl.
CPC ........ *H04M 1/0214* (2013.01); *G06F 1/1618* (2013.01); *G06F 1/1647* (2013.01);
(Continued)

(58) Field of Classification Search
CPC ..... G02F 1/1333; H01Q 1/243; H04M 1/0202
(Continued)

(56) References Cited

U.S. PATENT DOCUMENTS

| 9,069,332 B1* | 6/2015 | Gayles ................... G04F 10/00 |
| 2002/0042252 A1 | 4/2002 | Toyoda et al. |

(Continued)

FOREIGN PATENT DOCUMENTS

| EP | 1178647 A2 | 2/2002 |
| JP | H08-317027 A | 11/1996 |

(Continued)

OTHER PUBLICATIONS

International Search Report for PCT Application No. PCT/JP2013/003727, dated Jul. 16, 2013.

(Continued)

*Primary Examiner* — Thomas Lett

(57) ABSTRACT

A mobile terminal device (1) according to the present invention includes a housing (10) that includes a frame (30), a housing (20) that includes a frame (40), and hinges (51 and 52) that couple the frame (30) and the frame (40) around a pivotal axis (50). The housings (10, 20) include touch panels (12, 22). The frame (30) includes supporting members (32, 33) that extend in a direction away from the pivotal axis (50) and the frame (40) includes supporting members (42, 43) that extend in a direction away from the pivotal axis (50). The hinges (51, 52) generate torque in a direction opposite to that of a stress acting on the touch panels (12, 22) when the housings (10, 20) form a predetermined angle.

8 Claims, 6 Drawing Sheets

(51) Int. Cl.
*G06F 1/16* (2006.01)
*H04M 1/18* (2006.01)

(52) U.S. Cl.
CPC ........ *G06F 1/1681* (2013.01); *H04M 1/0216* (2013.01); *H04M 1/185* (2013.01); *H04M 1/0266* (2013.01); *H04M 2250/16* (2013.01); *H04M 2250/22* (2013.01)

(58) Field of Classification Search
USPC ..................................................... 455/575.3
See application file for complete search history.

(56) References Cited

U.S. PATENT DOCUMENTS

| | | | | |
|---|---|---|---|---|
| 2005/0054303 | A1* | 3/2005 | Goltermann | H04M 1/0245 455/90.3 |
| 2006/0111052 | A1* | 5/2006 | Gartrell | H01H 13/702 455/90.3 |
| 2007/0205122 | A1* | 9/2007 | Oda | H04M 1/0283 206/320 |
| 2009/0278764 | A1* | 11/2009 | Kuwahara | G03B 29/00 345/1.3 |
| 2010/0060587 | A1* | 3/2010 | Freund | G06F 1/1616 345/169 |
| 2010/0238621 | A1* | 9/2010 | Tracy | B29C 45/14639 361/679.27 |
| 2011/0249042 | A1* | 10/2011 | Yamamoto | G09G 3/342 345/690 |
| 2011/0254774 | A1* | 10/2011 | Yamamoto | G06F 1/1643 345/169 |
| 2012/0149438 | A1* | 6/2012 | Kwon | H04M 1/022 455/566 |
| 2012/0218692 | A1 | 8/2012 | Minemura et al. | |
| 2014/0007379 | A1* | 1/2014 | Yang | G06F 1/1681 16/277 |

FOREIGN PATENT DOCUMENTS

| | | |
|---|---|---|
| JP | 2008-215365 A | 9/2008 |
| JP | 2009-157195 A | 7/2009 |
| JP | 2009-164861 A | 7/2009 |
| JP | 2011-248403 A | 12/2011 |
| JP | 2011-259182 A | 12/2011 |
| JP | 2012-114739 A | 6/2012 |
| WO | 2012/008420 A | 1/2012 |

OTHER PUBLICATIONS

Extended European Search Report for EP Application No. EP13847133.9 dated May 19, 2016.

* cited by examiner

MOBILE TERMINAL DEVICE

This application is a National Stage Entry of PCT/JP2013/003727 filed on Jun. 13, 2013, which claims priority from Japanese Patent Application 2012-230555 filed on Oct. 18, 2012, the contents of all of which are incorporated herein by reference, in their entirety.

TECHNICAL FIELD

The present invention relates to a mobile terminal device, and more particularly, to a mobile terminal device that can be folded.

BACKGROUND ART

In recent years, use of mobile terminal devices such as mobile telephones or smartphones has become widespread. In particular, in mobile telephones, use of folding-type terminals has become widespread. In smartphones as well, use of foldable terminals has been proposed.

Patent literature 1 discloses a technique regarding a mobile terminal device capable of performing a correct dial operation while preventing damage to a hinge mechanism even when an excessive external force is applied to a transmitter unit opened with respect to a main body unit.

Patent literature 2 discloses a technique related to an electronic device including two screens in consideration of the balance of weights and the design. The electronic device disclosed in Patent literature 2 includes a first main unit having a surface thereof provided with a display panel, a second main unit having a surface thereof provided with a display panel, and a hinge mechanism coupling the first and second main units. Two operation buttons are arranged symmetrical with respect to a center line of the electronic device extending in a direction in which the two screens are arranged.

CITATION LIST

Patent Literature

Patent literature 1: Japanese Unexamined Patent Application Publication No. 08-317027
Patent literature 2: Japanese Unexamined Patent Application Publication No. 2011-248403

SUMMARY OF INVENTION

Technical Problem

In a folding-type mobile terminal device, for example, two housings are coupled about a pivotal axis using a hinge. By coupling the two housings using the hinge, the mobile terminal device can be set to an opened state in which the two housings are aligned with each other and a closed state in which the two housings overlap each other. As described above, by forming the mobile terminal device to have a plurality of states, the convenience of the mobile terminal device can be improved.

However, when a user operates an input unit (e.g., touch panel) of the mobile terminal device when the mobile terminal device is in the opened state, a stress acts on the input unit and the operation of the mobile terminal device may become unstable.

Based on the aforementioned problem, an exemplary object of the present invention is to improve an operability of the mobile terminal device that includes two housings.

Solution to Problem

A mobile terminal device according to the present invention includes: a first housing that includes a first frame; a second housing that includes a second frame; and a hinge that couples the first frame and the second frame around a pivotal axis, in which: an input unit is provided in at least one of the first and second housings, the first frame includes a first supporting member that extends in a direction away from the pivotal axis, the second frame includes a second supporting member that extends in a direction away from the pivotal axis, and the hinge generates torque in a direction opposite to that of a stress acting on the input unit when the first and second housings form a predetermined angle

Advantageous Effects of Invention

According to the present invention, it is possible to improve an operability of a mobile terminal device that includes two housings.

DESCRIPTION OF EMBODIMENTS

Hereinafter, with reference to the drawings, an exemplary embodiment of the present invention will be described.

Figure 1:
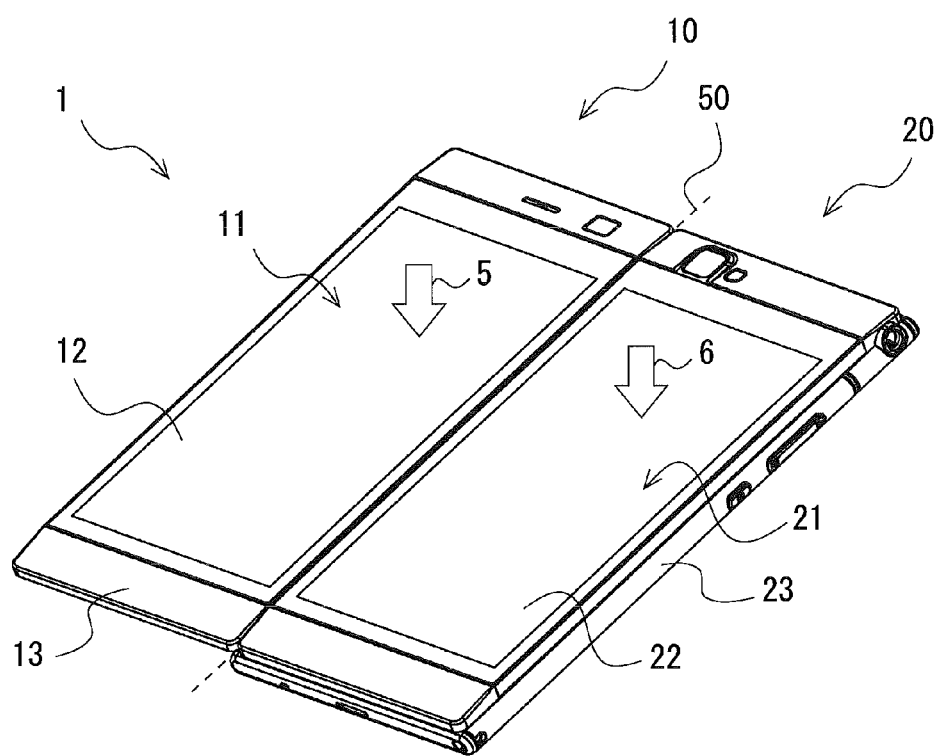
FIG. 1 is a perspective view showing a mobile terminal device according to an exemplary embodiment (opened state)

FIG. 1 is a perspective view showing a mobile terminal device according to this exemplary embodiment. As shown in FIG. 1, a mobile terminal device 1 according to this exemplary embodiment includes a housing A (first housing) 10 and a housing B (second housing) 20.

The housing A (10) includes a display unit 11 and a housing body 13. The display unit 11 includes, for example, a liquid crystal panel or an organic electro luminescence (EL) panel. Further, the display unit 11 includes a touch panel 12 as an input unit. Similarly, the housing B (20) includes a display unit 21 and a housing body 23. The display unit 21 includes, for example, a liquid crystal panel or an organic EL panel. The display unit 21 further includes a touch panel 22 as an input unit.

While a case in which the housing A (10) and the housing B (20) include touch panels 12 and 22 as input units will be described as an example in the following description, the input unit may be another input means (e.g., buttons) arranged on, for example, principal surfaces (surfaces on the display units 11 and 21) of the housing A (10) and the housing B (20). Further, the input unit may be arranged in at least one of the housing A (10) and the housing B (20) and is not necessarily arranged in both the housing A (10) and the housing B (20).

Figure 2:
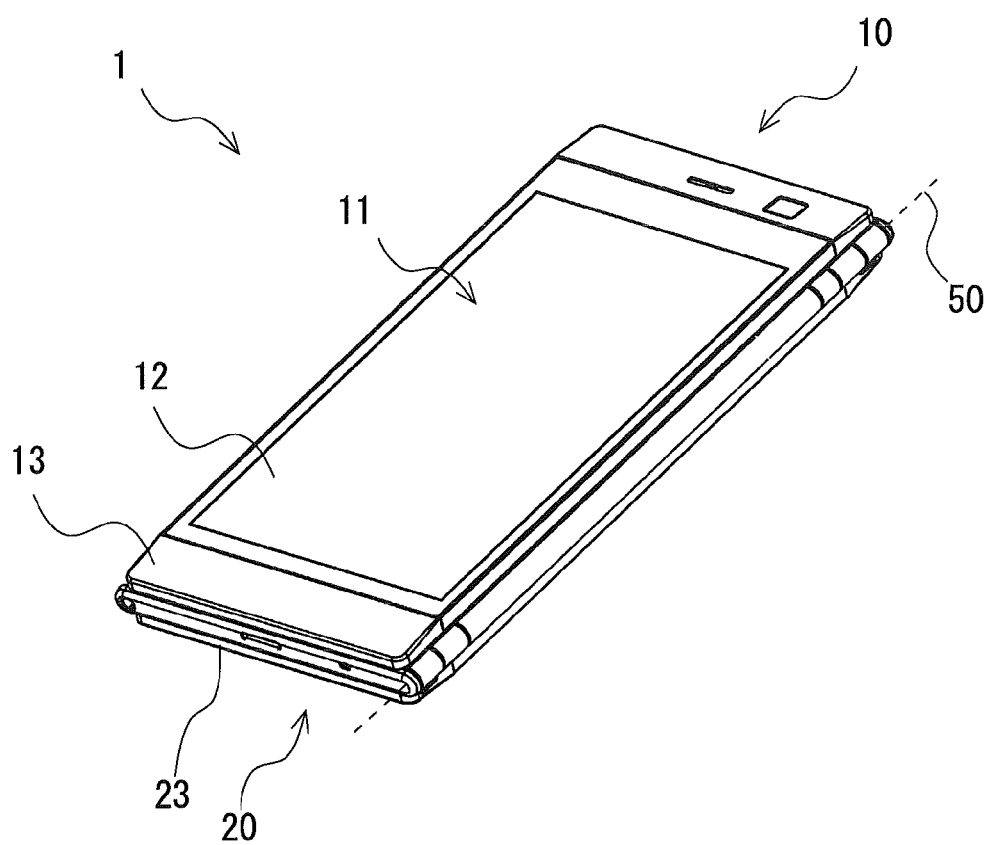
FIG. 2 is a perspective view showing the mobile terminal device according to the exemplary embodiment (closed state)

The mobile terminal device 1 according to this exemplary embodiment is formed in such a way that the housing A (10) and the housing B (20) can be opened or closed around a pivotal axis 50. As shown in FIG. 1, in the opened state (first state), the housing A (10) and the housing B (20) are arranged in such a way that a principal surface (surface on the side of the display unit 11) of the housing A (10) and a principal surface (surface on the side of the display unit 21) of the housing B (20) are substantially on the same plane. Further, as shown in FIG. 2, in the closed state (second state), the housing A (10) and the housing B (20) are arranged in such a way that both the surface of the housing A (10) on the side of the display unit 11 and the surface of the housing B (20) on the side of the display unit 21 face outwardly. In other words, in the closed state, the housing A (10) and the housing B (20) are arranged in such a way that the back surface of the housing A (10) and the back surface of the housing B (20) face each other.

As described above, the housing A (10) and the housing B (20) are allowed to relatively pivot in a range from 0 to 180°. For example, the housing A (10) pivots in a range from 0° (closed state shown in FIG. 2) to 180° (opened state shown in FIG. 1) with respect to the housing B (20). While the case in which the housing A (10) and the housing B (20) relatively pivot in the range from 0 to 180° is described in this exemplary embodiment, the housing A (10) and the housing B (20) may be formed so as to relatively pivot in a range from 0 to 360°, for example. In such a case, in addition to the closed state described above, there may be another closed state (e.g., a state in which the display unit 11 of the housing A (10) and the display unit 21 of the housing B (20) face each other).

Figure 3:
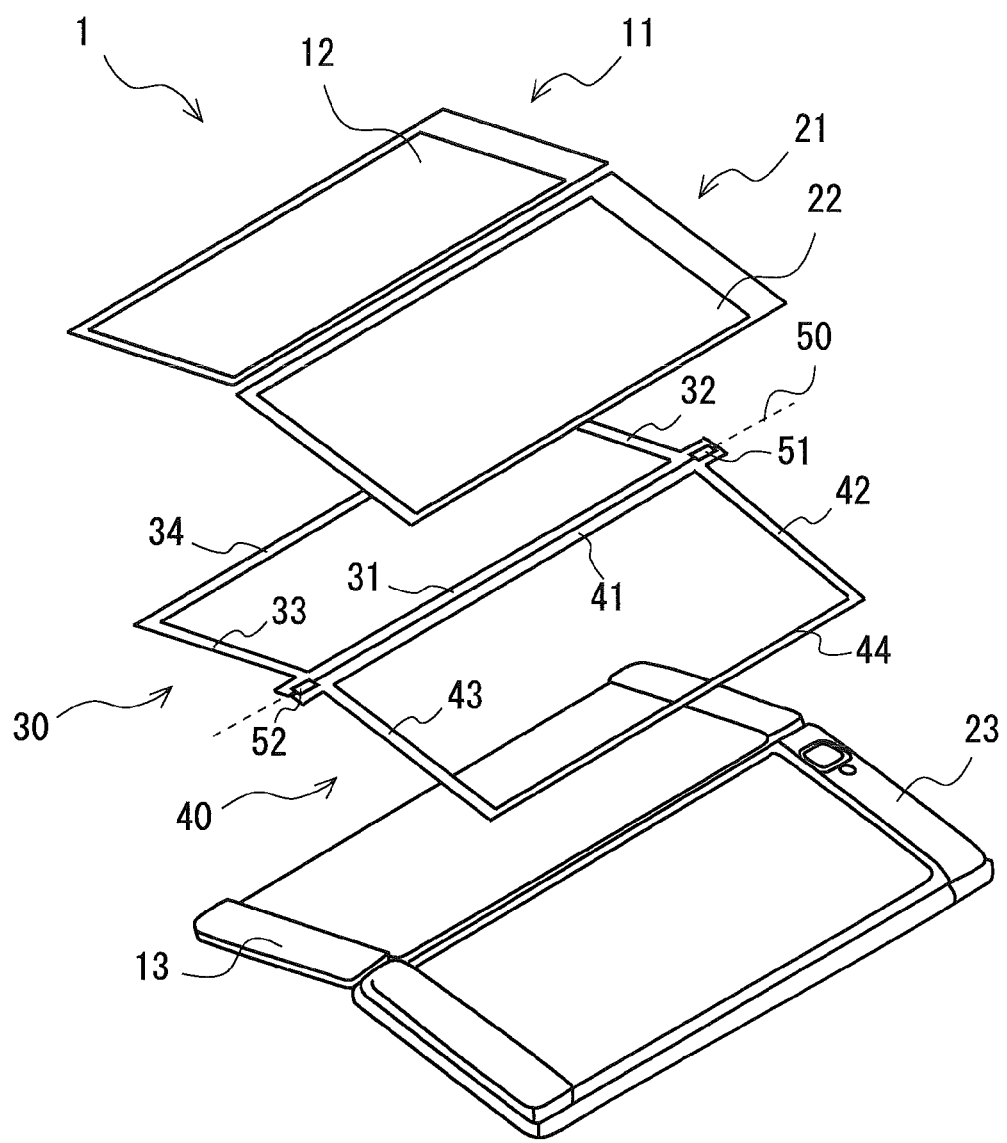
FIG. 3 is an exploded perspective view showing the mobile terminal device according to the exemplary embodiment.
Figure 4:
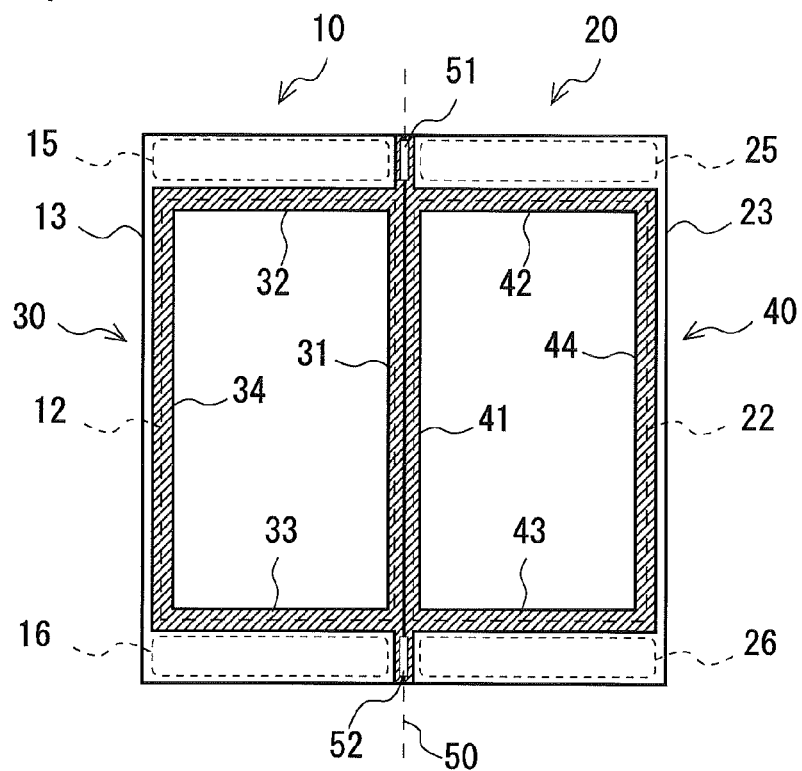
FIG. 4 is an upper diagram showing position of frames included in the mobile terminal device according to the exemplary embodiment.

FIG. 3 is an exploded perspective view showing the mobile terminal device according to this exemplary embodiment. FIG. 4 is an upper diagram showing positions of the frames included in the mobile terminal device according to this exemplary embodiment. As shown in FIG. 3, the housing A (10) includes a frame 30 (first frame). The frame 30 is arranged between the housing body 13 and the display unit 11 to surround the housing body 13. In a similar way, the housing B (20) includes a frame 40 (second frame). The frame 40 is arranged between the housing body 23 and the display unit 21 to surround the housing body 23.

As shown in FIGS. 3 and 4, the frame 30 includes supporting members 31 to 34. The supporting member 31 is arranged in parallel with the pivotal axis 50. The supporting members 32 and 33 (first supporting member) are arranged so as to extend in a direction away from the pivotal axis 50 (i.e., a direction perpendicular to the pivotal axis 50). The supporting member 34 is arranged so as to be parallel with the pivotal axis 50 and to be coupled with the supporting members 32 and 33. In summary, the frame 30 has a frame shape and includes the supporting members 31 to 34.

The frame 40 includes supporting members 41 to 44. The supporting member 41 is arranged in parallel with the pivotal axis 50. The supporting members 42 and 43 (second supporting member) are arranged so as to extend in a direction away from the pivotal axis 50 (i.e., direction perpendicular to the pivotal axis 50). The supporting member 44 is arranged so as to be parallel with the pivotal axis 50 and to be coupled with the supporting members 42 and 43. In summary, the frame 40 has a frame shape and includes the supporting members 41 to 44. The frames 30 and 40 are preferably formed of a material such as a metallic material having a high rigidity.

The touch panel 12 (display unit 11) is arranged to overlap the frame 30 when the housing A (10) is seen from a plan view. In other words, when the housing A (10) is seen from a plan view, the frame-like frame 30 is arranged around the touch panel 12. In a similar way, the touch panel 22 (display unit 21) is arranged to overlap the frame 40 when the housing B (20) is seen from a plan view. In other words, the frame-like frame 40 is arranged around the touch panel 22 when the housing B (20) is seen from a plan view. As described above, by arranging the touch panels 12 and 22 and the frames 30 and 40 so as to overlap each other, even when a stress acts on the touch panels 12 and 22 by an operation of a user, the stress acting on the touch panels 12 and 22 can be received by the frames 30 and 40.

The frames 30 and 40 are coupled to each other using hinges 51 and 52 so that the frames 30 and 40 can pivot about the pivotal axis 50. For example, the hinge 51 couples the supporting member 31 and the supporting member 41. At this time, the hinge 51 is provided on the outside of the supporting members 32 and 42 in the direction of the pivotal axis 50. Further, the hinge 52 is provided on the outside of the supporting members 33 and 43 in the direction of the pivotal axis 50. In other words, the hinges 51 and 52 are provided on the outside of the display units 11 and 21 in the direction of the pivotal axis. By arranging the hinges 51 and 52 in this way, it is possible to narrow the gap between the display unit 11 and the display unit 21 when the mobile terminal device 1 is used in the opened state.

Further, the hinges 51 and 52 are formed to allow, when the housing A (10) and the housing B (20) form a predetermined angle, the housing A (10) and the housing B (20) to keep the predetermined angle. For example, the hinges 51 and 52 are formed to allow the housing A (10) and the housing B (20) to keep the opened state and the closed state.

Further, in the mobile terminal device 1 according to this exemplary embodiment, each of the hinges 51 and 52 is formed in such a way as to generate torque in a direction opposite to that of a stress acting on the touch panels 12 and 22 when the housing A (10) and the housing B (20) form a predetermined angle. The hinges 51 and 52 are preferably formed to generate substantially the same torque.

Consider a case, for example, in which the mobile terminal device 1 is used in the opened state as shown in FIG. 1. In this case, when the user operates the touch panel 12, a stress acts on the housing A (10) in the direction shown by the arrow 5. Further, when the user operates the touch panel 22, a stress acts on the housing B (20) in the direction shown by the arrow 6. Since the direction (arrows 5 and 6) in which the stress acts on is the same as that of the force that acts when the state of the mobile terminal device 1 is changed to the closed state, the mobile terminal device 1 changes from the opened state to the closed state when the stress works in the direction shown by the arrows 5 and 6. Therefore, the operation of the mobile terminal device may not be stable.

In the mobile terminal device 1 according to this exemplary embodiment, the hinges 51 and 52 are formed to generate torque in a direction opposite to the direction indicated by the arrows 5 and 6. In summary, the hinges 51 and 52 are formed so that the reaction force that counteracts the stress generated by the operation of the touch panels 12 and 22 acts on the housing A (10) and the housing B (20). For example, the torque generated by the hinges 51 and 52 is the sum of the torque that is necessary for the housing A (10) and the housing B (20) to keep the opened state (i.e., torque that counteracts the weights of the housing A (10) and the housing B (20)) and the torque to counteract the stress generated by the operation of the touch panels 12 and 22.

Note that the torque to counteract the stress generated by the operation of the touch panels 12 and 22 can be arbitrarily set. By increasing the torque set value, for example, it is possible to prevent such a situation in which the mobile terminal device 1 is changed to the closed state from the opened state due to the operations of the touch panels 12 and 22. When the torque set value is made too large, a large force is required to change the state of the mobile terminal device 1 from the opened state to the closed state, which degrades the operability of the mobile terminal device 1. On the other hand, when the torque set value is too small, the state of the mobile terminal device 1 is easily changed from the opened state to the closed state by the operations of the touch panels 12 and 22, which degrades the operability of the mobile terminal device 1. It is preferable that the torque set value be set to an optimal value in consideration of this point.

Further, the mobile terminal device 1 according to this exemplary embodiment has an integral configuration in which the frames 30 and 40 are coupled to each other using the hinges 51 and 52. Therefore, it is possible to obtain stable operability without wobbling regardless of the position in which the wide touch panels 12 and 22 are operated. In particular, when a position apart from the hinges 51 and 52 is operated, a force is applied to deform the housing. However, by integrally forming the frames 30 and 40 and the hinges 51 and 52, the rigidity of the housing can be improved and the deformation of the housing can be suppressed. It is therefore possible to obtain stable operability regardless of the position in which the touch panels 12 and 22 are operated.

With the invention according to this exemplary embodiment stated above, it is possible to improve the operability of the mobile terminal device that includes two housings.

Further, in the mobile terminal device 1 according to this exemplary embodiment, as shown in FIG. 4, an antenna may be provided in at least one of antenna areas 15 and 16 of the housing A (10) and antenna areas 25 and 26 of the housing B (20). In summary, the antenna may be provided in a periphery of the frames 30 and 40 in the direction of the pivotal axis 50. By providing the antenna as stated above, it is possible to prevent radio waves received by the antenna from being interrupted even when the frame is made of a metallic material.

At this time, a supporting member that is the closest to the position where the antenna is arranged among the supporting members 32 and 33 forming the frame 30 and the supporting members 42 and 43 forming the frame 40 may be formed of a material such as a resin material that transmits radio waves. According to such a configuration, it is possible to further reduce the influence of the frame on the antenna compared to the case in which all of the frames 30 and 40 are formed of a metallic material.

Figure 5:
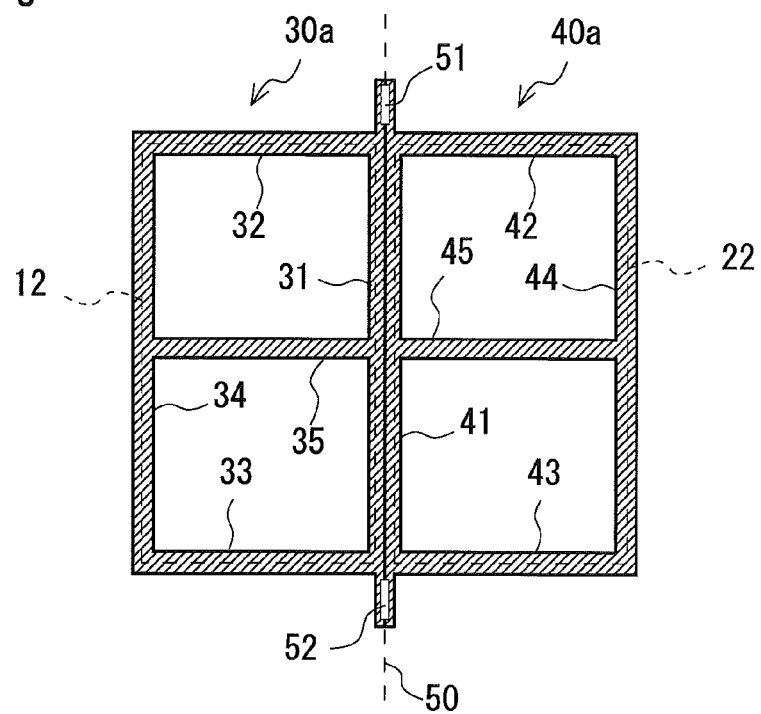
FIG. 5 is a diagram showing another example of the frames included in the mobile terminal device according to the exemplary embodiment.

Further, in the mobile terminal device according to this exemplary embodiment, as shown in FIG. 5, a frame 30*a* may be formed using supporting members 31 to 35 and a frame 40*a* may be formed using supporting members 41 to 45. That is, the supporting member 35 (third supporting member) may be further provided at a central part of the frame 30 in the direction of the pivotal axis with respect to the supporting members 32 and 33 shown in FIG. 4 to form the frame 30*a*. In a similar way, the supporting member 45 (fourth supporting member) may be further provided at a central part of the frame 40 in the direction of the pivotal axis with respect to the supporting members 42 and 43 to form the frame 40*a*. According to such a configuration, it is possible to improve the strength of the frames 30 and 40.

Figure 6:
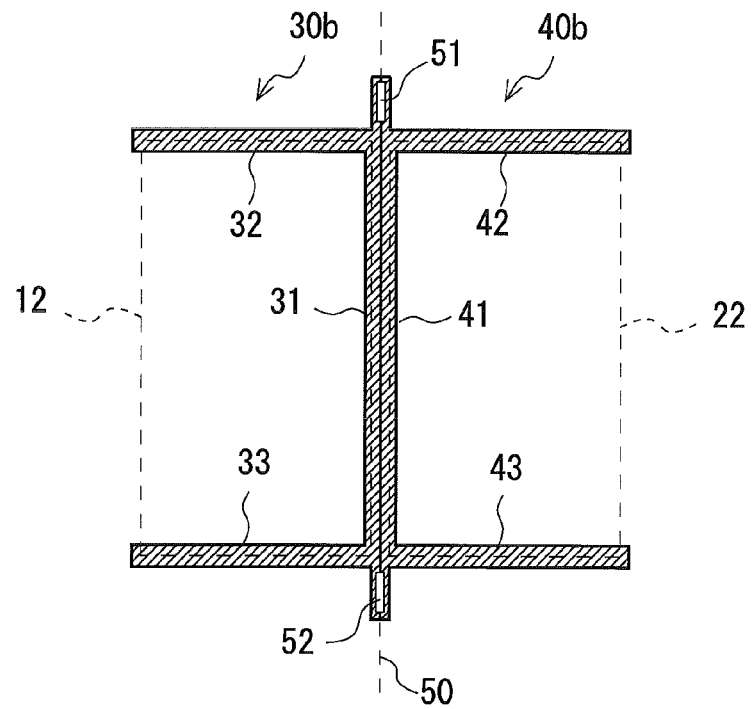
FIG. 6 is a diagram showing another example of the frames included in the mobile terminal device according to the exemplary embodiment.

Further, in the mobile terminal device according to this exemplary embodiment, as shown in FIG. 6, a frame 30*b* may be formed using the supporting members 31 to 33 and a frame 40*b* may be formed using the supporting members 41 to 43. In summary, the supporting members 34 and 44 of the frames 30 and 40 shown in FIG. 4 may be omitted. In this case, the number of supporting members that form the frames 30 and 40 can be reduced compared to the case shown in FIG. 4, whereby the cost of the material can be reduced.

At this time, the supporting members 32 and 33 of the frame 30*b* are arranged in the respective sides of the touch panel 12 in the direction of the pivotal axis when the housing A (10) is seen from a plan view. Further, the supporting members 42 and 43 of the frame 40*b* are arranged in the respective sides of the touch panel 22 in the direction of the pivotal axis when the housing B (20) is seen from a plan view. Since the stress generated by the operation of the touch panels 12 and 22 can be mainly received by the supporting members 32 and 33 and the supporting members 42 and 43, the influence on the strength of the frames 30 and 40 due to the omission of the supporting members 34 and 44 is small.

Figure 7:
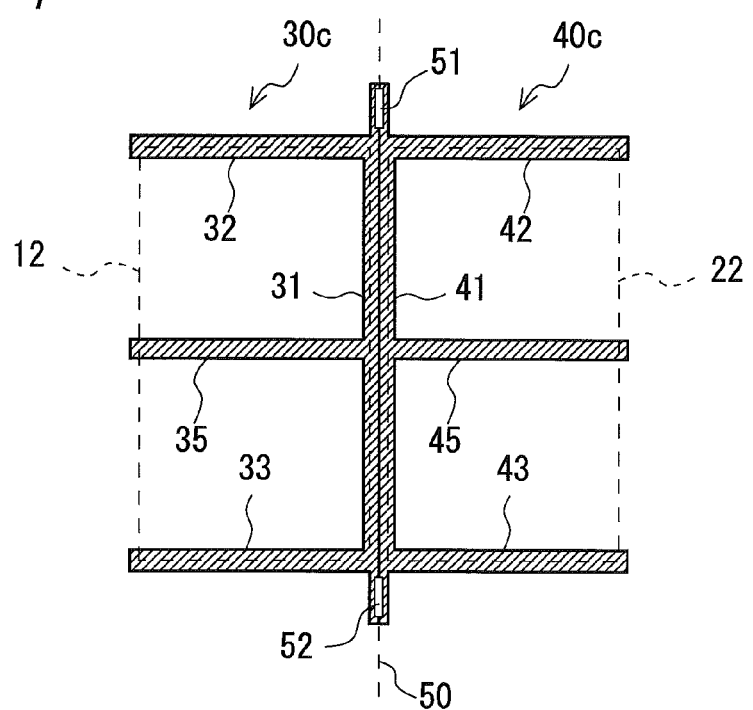
FIG. 7 is a diagram showing another example of the frames included in the mobile terminal device according to the exemplary embodiment.

Further, in the mobile terminal device according to this exemplary embodiment, as shown in FIG. 7, a frame 30*c* may be formed using the supporting members 31 to 33 and 35 and the frame 40*c* may be formed using the supporting members 41 to 43 and 45. In summary, the supporting member 35 may be further provided in the frame 30*b* shown in FIG. 6 to form the frame 30*c*. In a similar way, the supporting member 45 may be further provided in the frame 40*b* to form the frame 40*c*. According to such a configuration, it is possible to improve the strength of the frames 30*c* and 40*c* against the stress generated by the operation of the touch panels 12 and 22.

Figure 8:
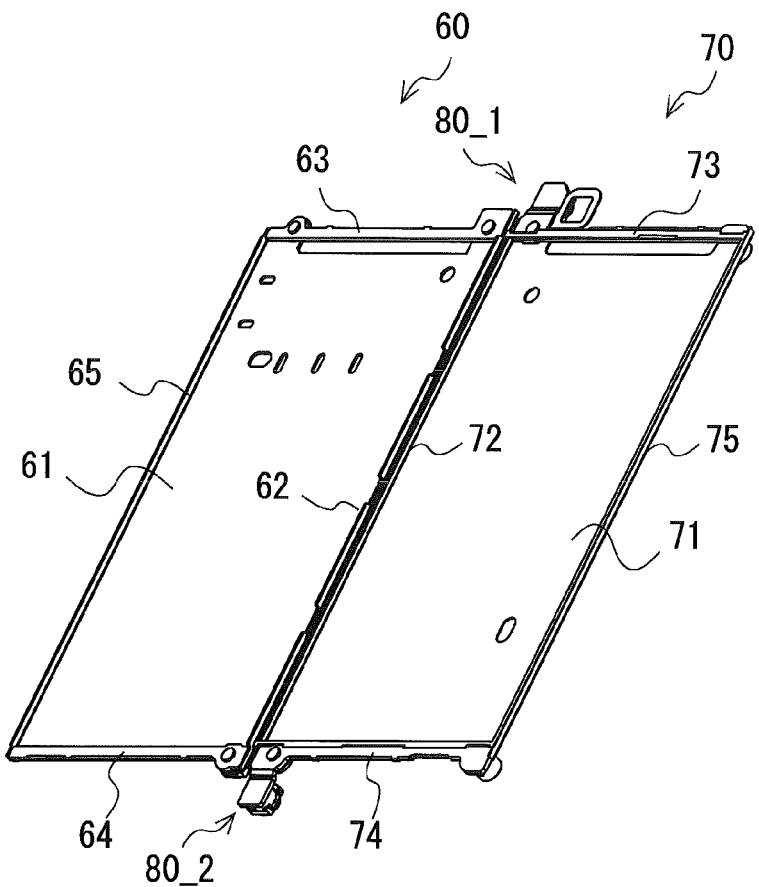
FIG. 8 is a diagram showing another example of the frames included in the mobile terminal device according to the exemplary embodiment.

Further, in the mobile terminal device according to this exemplary embodiment, as shown in FIG. 8, a frame 60 may be formed using a plate-like member 61 (first plate-like member) and supporting members 62 to 65 and a frame 70 may be formed using a plate-like member 71 (second plate-like member) and supporting members 72 to 75. That is, the frame 60 may be formed by arranging the supporting members 62 to 65 around the plate-like member 61 in a frame-like manner, and the frame 70 may be formed by arranging the supporting members 72 to 75 around the plate-like member 71 in a frame-like manner. In this case, some of the supporting members (e.g., supporting members 65 and 75) may be formed by bending the peripheries of the plate-like members 61 and 71.

In this case as well, the frames 60 and 70 are coupled to each other so that the frames 60 and 70 can pivot about the pivotal axis using hinges 80_1 and 80_2. The hinge 80_1 is provided on the outside of the supporting members 63 and 73 in the direction of the pivotal axis. Further, the hinge 80_2 is provided on the outside of the supporting members 64 and 74 in the direction of the pivotal axis.

Figure 9:
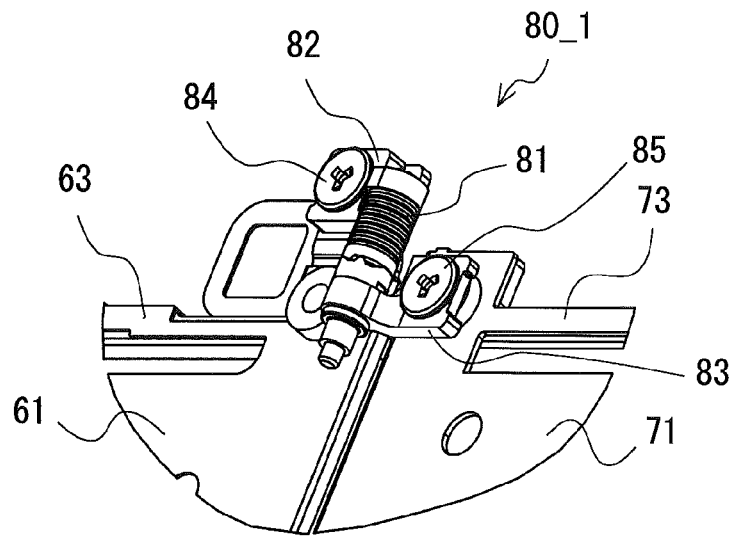
FIG. 9 is a diagram in which a hinge part of the frame shown in FIG. 8 is enlarged.

FIG. 9 is a diagram in which the hinge 80_1 of the frame shown in FIG. 8 is enlarged. As shown in FIG. 9, the hinge 80_1 includes a hinge body 81 and fixing parts 82 and 83. One fixing part 82 of the hinge 80_1 is fixed to the frame 60 using a screw 84. Further, the other fixing part 83 of the hinge 80_2 is fixed to the frame 70 using a screw 85. The configuration of the hinge 80_2 is similar to that of the hinge 80_1.

As stated above, by providing the plate-like members 61 and 71 in the frames 60 and 70, the strength of the frames 60 and 70 can be improved.

While the case in which two hinges couple the frames is described in the above exemplary embodiment, three or more hinges may be used to couple the frames.

While the present invention has been described with reference to the exemplary embodiment, the present invention is not limited to the above exemplary embodiment. Various changes that can be understood by those skilled in the art can be made to the configuration and the details of the present invention within the scope of the present invention.

This application is based upon and claims the benefit of priority from Japanese Patent Application No. 2012-230555, filed on Oct. 18, 2012, the disclosure of which is incorporated herein in its entirety by reference.

REFERENCE SIGNS LIST

1 MOBILE TERMINAL DEVICE
10 HOUSING
11 DISPLAY UNIT
12 TOUCH PANEL
13 HOUSING BODY
15, 16 ANTENNA AREAS
20 HOUSING
21 DISPLAY UNIT
22 TOUCH PANEL
23 HOUSING BODY
25, 26 ANTENNA AREAS
30 FRAME
31, 32, 33, 34, 35 SUPPORTING MEMBERS
40 FRAME
41, 42, 43, 44, 45 SUPPORTING MEMBERS
50 PIVOTAL AXIS
51, 52 HINGES
60 FRAME
61 PLATE-LIKE MEMBER
62, 63, 64, 65 SUPPORTING MEMBERS
70 FRAME
71 PLATE-LIKE MEMBER
72, 73, 74, 75 SUPPORTING MEMBERS
80_1, 80_2 HINGES
82, 83 FIXING MEMBERS
84, 85 SCREWS

The invention claimed is:

1. A mobile terminal device comprising:
a first housing that comprises a first frame;
a second housing that comprises a second frame; and
a hinge that couples the first frame and the second frame around a pivotal axis, wherein:
the first frame comprises a first supporting member that extends in a direction away from the pivotal axis,
the second frame comprises a second supporting member that extends in a direction away from the pivotal axis,
the first housing comprises a first touch panel provided on a principal surface thereof,
the second housing comprises a second touch panel provided on a principal surface thereof,
the hinge is provided on the outside of the first and second touch panels in a direction of the pivotal axis,
the hinge couples the first and second housings in such a way as to allow the first and second housings to be in a first state in which the principal surface of the first housing and the principal surface of the second housing are substantially on the same plane and in a second state in which the principal surface of the first housing and the principal surface of the second housing face outwardly,
when the principal surface of the first housing and the principal surface of the second housing are substantially on the same plane, the hinge generates torque in a direction opposite to that of the stress acting on the first and second touch panels,
an antenna is provided in a periphery of the first frame in a direction of the pivotal axis,
a supporting member that is the closest to a position of the first frame where the antenna is arranged is formed of a resin material, and
other supporting members are formed of metallic material.

2. The mobile terminal device according to claim 1, wherein the hinge is provided on the outside of the first and second supporting members in a direction of the pivotal axis.

3. The mobile terminal device according to claim 1, wherein:
the first supporting member is arranged on each end of the first touch panel in the direction of the pivotal axis when the first housing is seen from a plan view, and
the second supporting member is arranged on each end of the second touch panel in the direction of the pivotal axis when the second housing is seen from a plan view.

4. The mobile terminal device according to claim 1, wherein:
the first frame has a frame shape and comprises the first supporting member,
the second frame has a frame shape and comprises the second supporting member,
the first frame is arranged around the first touch panel when the first housing is seen from a plan view, and
the second frame is arranged around the second touch panel when the second housing is seen from a plan view.

5. The mobile terminal device according to claim 4, wherein:
the first frame further comprises a first plate-like member and a supporting member including the first supporting member is arranged around the first plate-like member in a framelike manner, and
the second frame further comprises a second plate-like member and a supporting member including the second supporting member is arranged around the second plate-like member in a frame-like manner.

6. The mobile terminal device according to claim 1, wherein torque generated by the hinge is a sum of torque to counteract weights of the first and second housings and a stress to counteract the stress acting on the input unit.

7. The mobile terminal device according to claim 1, wherein:
the first frame comprises the first supporting member provided on each end thereof in the direction of the pivotal axis, the second frame comprises the second supporting member provided on each end thereof in the direction of the pivotal axis, and the hinge is provided on each end of the first and second frames in a direction of the pivotal axis, each of the hinges provided on the outside of the first and second supporting members in the direction of the pivotal axis.

8. The mobile terminal device according to claim 7, wherein:

the first frame comprises a third supporting member at a central part thereof in the direction of the pivotal axis with respect to the first supporting member, and the second frame comprises a fourth supporting member at a central part thereof in the direction of the pivotal axis with respect to the second supporting member.

* * * * *

UNITED STATES PATENT AND TRADEMARK OFFICE
CERTIFICATE OF CORRECTION

PATENT NO. : 9,883,015 B2  
APPLICATION NO. : 14/435229  
DATED : January 30, 2018  
INVENTOR(S) : Ryota Michino Page 1 of 1

It is certified that error appears in the above-identified patent and that said Letters Patent is hereby corrected as shown below:

On the Title Page

Delete "(73) Assignee: NEC Mobile Communications, Ltd., Kanagawa (JP)"  
Insert --(73) Assignee: NEC Corporation, Tokyo (JP)--

Signed and Sealed this  
Twenty-third Day of October, 2018

Andrei Iancu  
*Director of the United States Patent and Trademark Office*